Aug. 31, 1965  A. SCHMERMUND  3,203,292
CUTTING ARRANGEMENTS
Filed Nov. 7, 1962  3 Sheets-Sheet 1

INVENTOR:
ALFRED SCHMERMUND
By: NOLTE + NOLTE
ATTORNEYS

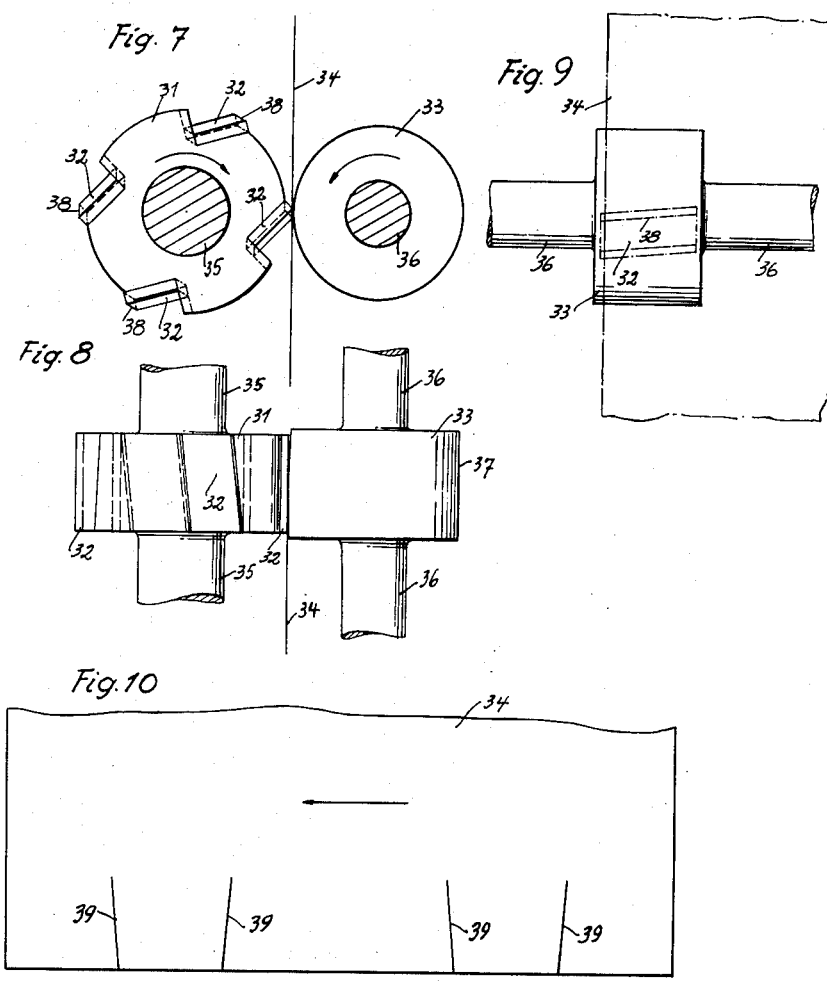

United States Patent Office

3,203,292
Patented Aug. 31, 1965

3,203,292
CUTTING ARRANGEMENTS
Alfred Schmermund, 62 Kornerstrasse, Gevelsberg, Westphalia, Germany
Filed Nov. 7, 1962, Ser. No. 235,980
Claims priority, application Germany, Nov. 10, 1961, Sch 30,543
3 Claims. (Cl. 83—341)

The invention relates to cutting arrangements for cutting logitudinally moving webs.

Cutting arrangements have been proposed which comprise a cutter roller provided with a cutter and adapted to cooperate with a counter-roller for cutting a moving paper web or the like arranged therebetween. In the simplest case the rollers are rotatable about axes which extend transversely to the direction of travel of the web and the cutting edge of the cutter extends parallel to these axes. Thus, the entire cut is effected instantaneously and high cutting pressures are necessary. On account of the chopping action by which the cut is effected, the cutting edge is liable to be damaged.

Arrangements have also been proposed in which, for achieving a slicing cut which begins at one margin of the web and proceeds to the other margin, the cutter is arranged with a skew inclination relative to the axis of rotation of the cutter roller and is ground so that the cutting edge lies in a cylindrical plane. Grinding and regrinding of such cutters is difficult, and these arrangements are therefore expensive, both initially and with regard to maintenance.

Accordingly, it is an object of the invention to provide a cutting arrangement in which the disadvantages of a chopping cut are avoided.

It is another object of the invention to provide a cutting arrangement with which a sliding cut is obtained.

It is a further object of the invention to provide a cutting arrangement in which the cutter or each cutter, if a plurality of cutters are provided, is easy to be ground or re-ground.

It is a more specific object of the invention to provide a cutting arrangement in which the cutting edge of the cutter or of each cutters is rectilinear and with which, nevertheless, a sliding cut is obtainable.

These and other objects and advantages will become apparent to those skilled in the art from the following detailed description when read with reference to the attached drawings, which are given by way of example and in which:

FIG. 7 is an end view, partly in section, of yet another cutting arrangement;

FIG. 8 is a plan view of the arrangement of FIG. 7;

FIG. 9 is a view of a counter-roller of the arrangement of FIG. 7; and

FIG. 10 is a plan view of a paper sheet.

Figure 1:
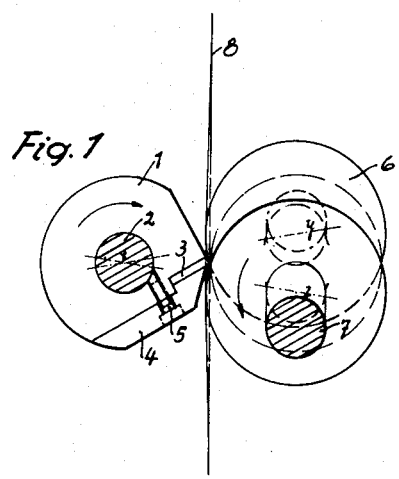
FIG. 1 is an end view, partly in section, of a cutting arangement.
Figure 2:
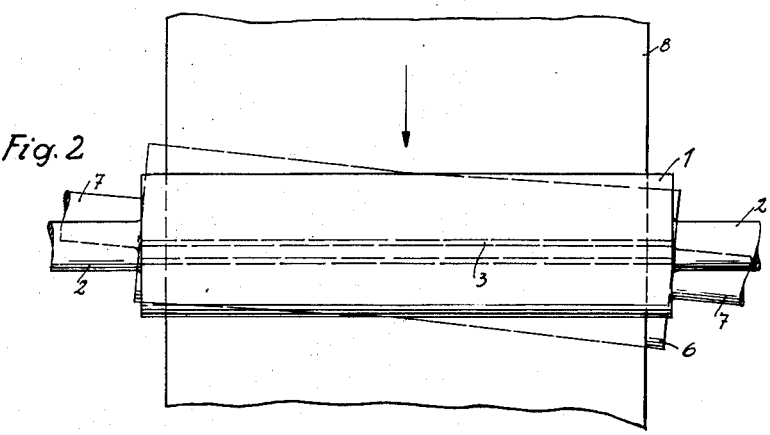
FIG. 2 is a side view of the arrangement of FIG. 1.

In the cutting arrangement of FIGS. 1 and 2, a cutter roller 1 and a counter-roller 6 are provided, which cooperate to cut a paper web 8. The cutter roller 1 is rotatable by means of a shaft 2 on which it is mounted, and comprises a cutter 3 having a straight cutting edge extending parallel to the axis of the shaft 2. The cutter 3 is held by means of a clamping plate 4 which is secured to the body of the roller 1 by means of screws 5 (of which only one is visible in the drawings).

In FIG. 2 the arrow shown on the paper web 8 indicates its travelling direction when moved by known means, not shown. It will be seen from FIG. 2 that the cutter roller 2, and thus the cutting edge of the cutter 3 thereon, extend at right angles to the direction of travel of the web 8. The counter-roller 6, however, is arranged with its axis at an angle, not being a right angle, to the direction of travel of the web 8. It will be appreciated that although the cutting edge of the cutter 3 is straight, the fact that the axis of the counter-roller 6 is inclined relative to the axis of the cutter roller 1 and relative to the cutting edge of the cutter 3 makes it necessary for the surface of the counter-roller 6 to be of hyperboloid form. As shown in FIG. 2 the surface of the counter-roller is of concave hyperboloidal form.

As is known, a hyperboloid is generated as the locus of a straight line generatrix on rotation of the line about the central axis of an imaginary cylinder, the line connecting a point on one of the circles defining the cylinder ends with a corresponding but angularly displaced point on the circle defining the other end of the cylinder. Thus, in the case of FIGS. 1 and 2, by suitably inclining the counter-roller 6 and by giving it a slightly concave hyperboloidal shape, it can be achieved that the entire length of the cutting edge of the cutter 3 is successively engaged by the hyperboloidal surface of the counter-roller 6 so that a progressive cutting from one margin of the web 8 to the other is obtained, rather than an instantaneous chopping cut effected simultaneously over the entire web width. As viewed in FIG. 2, the cutting takes place from the left hand margin of the web 8 to the right, on a cutting line which extends exactly at right angles to the direction of travel of the web 8. The speed with which the cutting of the web 8 is effected, depends on the extent to which the counter-roller 6 is inclined from the purely transverse position and this in turn determines the degree of hyperbolic concavity necessary for the counter-roller 6. In FIG. 1 the difference in height of the respective ends of the counter-roller 6 can be seen from the lines *x–y* and *x–z*.

The counter-roller 6 can readily be ground to a hyperboloidal form in a profile grinding machine, or even in a normal cylinder grinding machine if the counter-roller 6 is arranged to have the same inclination relative to the grinding wheel axis as it has relative to the cutter roller axis when in its normal working position and if the diameter of the grinding wheel is equal to or less than the diameter of the cutter roller 1.

Figure 3:
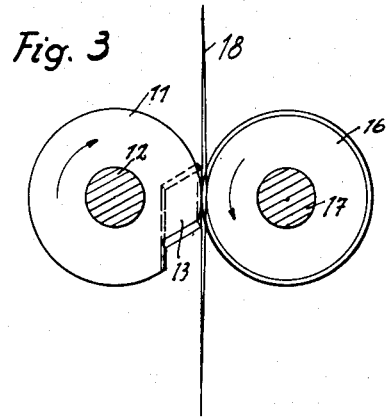
FIG. 3 is an end view, partly in section, of another cutting arrangement.
Figure 4:
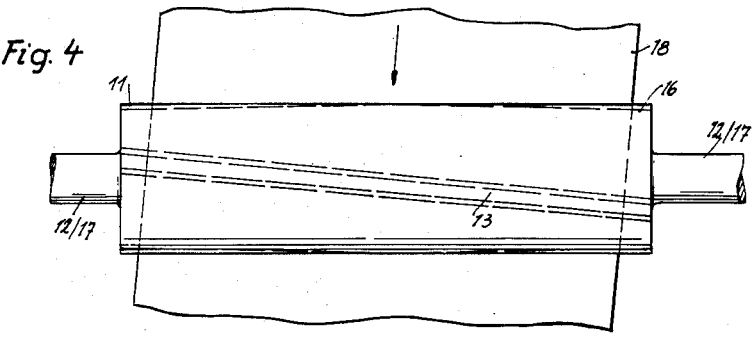
FIG. 4 is a side view of the arrangement of FIG. 3.

In the arrangement of FIGS. 3 and 4, a cutter roller 11 mounted on a shaft 12 and a counter-roller 16 mounted on a shaft 17 are provided, which cooperate for cutting a paper web 18. The axes of the shafts 12 and 17 are parallel to each other and oblique to the direction of travel of the web 18. A cutter 13 is arranged on the cutter roller 1, with its cutting edge oblique to the axis of the shaft 12. Thus, a cutting action is obtained which begins at the left hand margin of the web 18 as viewed in FIG. 4 and progresses over the web width to the right hand margin thereof. It will be appreciated that in this case, for the counter-roller surface to progressively contact all points on the straight cutting edge of the cutter 13, the counter-roller requires to be of convex hyperboloidal form.

It will be seen that the arrangement of FIGS. 1 and 2 a concave counter-roller is needed if the cutting edge of the cutter extends parallel to the axis of rotation of the cutter roller and the axis of the counter-roller has a skew inclination relative to the axis of the cutter roller. From the arrangement of FIGS. 3 and 4 it will be seen that if the axes of both rollers are parallel and the cutting edge of the cutter is inclined to the axis of the cutter roller, so as to itself from the generatrix of a hyperboloid, then a convex counter-roller is needed.

Figure 5:
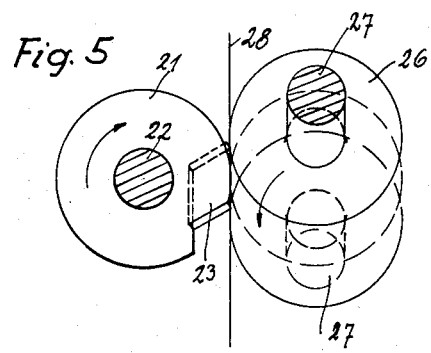
FIG. 5 is an end view, partly in section, of a further cutting arrangement.
Figure 6:
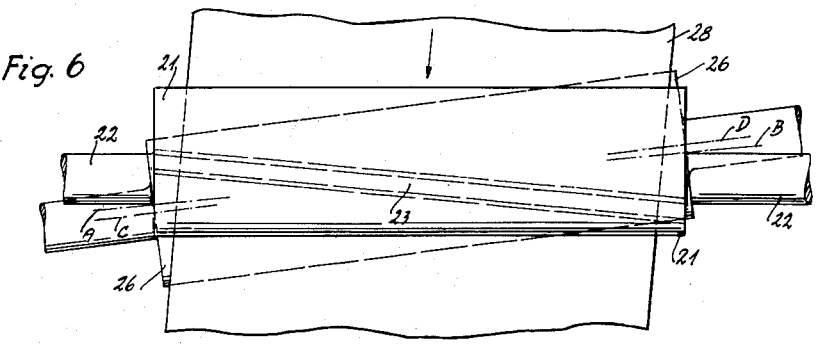
FIG. 6 is a side view of the arrangement of FIG. 5.

These two cases are combined in the arrangement of FIGS. 5 and 6 and by suitable choice of the relative inclination of the axes of the two rollers and of the inclination of the cutting edge of the cutter, it can be achieved that a cylindrical counter-roller can be used and nevertheless a cutting action obtained which progresses from one margin of the web to the other.

The arrangement of FIGS. 5 and 6 comprise a cutter roller 21 mounted on a shaft 22 and a cylindrical counter-roller 26 mounted on a shaft 27, the two rollers cooperating for cutting a paper web 28. As will be seen from FIG. 6 the rollers 21 and 26 are arranged with their axes inclined beyond the purely transverse position, relative to the direction of travel of the web 28, and the cutting edge of the cutter 23 is arranged at a skew inclination to the axis of the cutter roller 21. The line of action A–B of the cutting edge against the counter-roller 26 is not parallel to the axis A–D of the counter-roller. The line A–B thus has the form of a shallow elliptical curve and, on rotation of the counter-roller 26, forms a hyperboloid.

The arrangement of FIGS. 7, 8 and 9 is intended for making marginal cuts in a paper web, such as the cuts 39 in the web 34 of FIG. 10, for example for forming flaps in wrapping material. The arrangement is generally similar to that of FIGS. 3 and 4, but the cutter roller 31 and counter-roller 33, which are respectively mounted on mutually parallel shafts 35 and 36 are of relatively narrow breadth so as only to engage a marginal region of the web 34.

The cutter roller 31 is provided with a plurality of cutters 32 having straight cutting edges 38, the edges 38 being inclined alternately in one and the other direction. The counter-roller 33 has a slightly convex hyperboloidal surface form 37. The position of one of the cutters 32 relative to the counter-roller 33 is shown in broken lines in FIG. 9. In making marginal cuts in a web of wrapping material, an arrangement such as that of FIGS. 7, 8 and 9 would be used at each margin of the web.

While some preferred embodiments of the invention have been described in detail, it should be clearly understood that the invention is not limited to the described embodiments thereof. In fact, many modifications, additions and omissions are possible without departing from the spirit of the invention.

I claim:

1. In an arrangement for cutting a longitudinal travelling web in a direction different from the direction of travel, the combination comprising a rotatable member, at least one cutter rigidly mounted on said rotatable member, a rectilinear cutting edge on said cutter, and a rotatable counter-roller, a surface of which is a cylindrical form and arranged for contacting said cutting edge progressively along its length after said cutting edge has penetrated the web when travelling between said rotatable member and said counter-roller, the axes of rotation of said rotatable member and the counter-roller having different inclinations relative to the direction of travel of the web, the cutting edge of said cutter having a skew inclination relative to the axis of rotation of said rotatable member.

2. A combination as defined in claim 1, wherein the axes of rotation of said counter-roller has a greater inclination relative to the direction of travel of the web than the axis of rotation of said rotatable member.

3. In an arrangement of cutting a longitudinal travelling web perpendicularly to the direction of travel, the combination comprising a rotatable member the axis of rotation of said rotatable member being inclined to the direction of travel of the web at angles different from a rectangle, at least one cutter rigidly mounted on said rotatable member, a rectilinear cutting edge on said cutter, said cutting edge being rectangular to the direction of travel of the web, and a rotatable cylindrical counter-roller, the axis of rotation of said counter-roller being inclined to the direction of travel of the web to a greater degree than the axis of rotation of said rotatable member, said cutter and said counter-roller being arranged so that said cutting edge along its length progressively contacts the cylindrical surface of said counter-roller after said cutting edge has penetrated the web, when travelling between said rotatable member and said counter-roller.

References Cited by the Examiner

UNITED STATES PATENTS

| 39,074 | 6/63 | Smith | 83—341 |
| 1,006,783 | 10/11 | Paquin | 83—341 |
| 2,829,693 | 4/58 | Jarvis | 83—346 |

FOREIGN PATENTS

| 59,532 | 6/13 | Austria. |
| 246,493 | 5/12 | Germany. |
| 670,171 | 1/39 | Germany. |

ANDREW R. JUHASZ, *Primary Examiner.*